United States Patent
Vaidyanathan et al.

(10) Patent No.: US 7,543,192 B2
(45) Date of Patent: Jun. 2, 2009

(54) ESTIMATING THE RESIDUAL LIFE OF A SOFTWARE SYSTEM UNDER A SOFTWARE-BASED FAILURE MECHANISM

(75) Inventors: Kalyanaraman Vaidyanathan, San Diego, CA (US); Kenny C. Gross, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 409 days.

(21) Appl. No.: 11/471,205

(22) Filed: Jun. 20, 2006

(65) Prior Publication Data

US 2008/0010556 A1 Jan. 10, 2008

(51) Int. Cl.
G06F 11/00 (2006.01)
(52) U.S. Cl. .......................................... 714/47; 714/38
(58) Field of Classification Search .................... 714/38, 714/47
See application file for complete search history.

(56) References Cited

U.S. PATENT DOCUMENTS

| | | | | |
|---|---|---|---|---|
| 5,867,809 | A * | 2/1999 | Soga et al. | 702/130 |
| 6,092,221 | A * | 7/2000 | Hiratsuka | 714/47 |
| 6,490,543 | B1 * | 12/2002 | Jaw | 702/184 |
| 6,557,120 | B1 * | 4/2003 | Nicholson et al. | 714/38 |
| 6,622,264 | B1 * | 9/2003 | Bliley et al. | 714/26 |
| 6,629,266 | B1 * | 9/2003 | Harper et al. | 714/23 |
| 6,643,801 | B1 * | 11/2003 | Jammu et al. | 714/37 |
| 6,738,811 | B1 * | 5/2004 | Liang | 709/224 |
| 6,799,154 | B1 * | 9/2004 | Aragones et al. | 703/22 |
| 6,810,495 | B2 * | 10/2004 | Castelli et al. | 714/47 |
| 6,820,215 | B2 * | 11/2004 | Harper et al. | 714/15 |
| 7,222,048 | B2 * | 5/2007 | Petchenev et al. | 702/182 |
| 7,308,614 | B2 * | 12/2007 | Kojori | 714/47 |
| 7,353,431 | B2 * | 4/2008 | Lopez et al. | 714/47 |
| 2003/0079154 | A1 * | 4/2003 | Park et al. | 714/1 |
| 2003/0216888 | A1 * | 11/2003 | Ridolfo | 702/181 |
| 2004/0078657 | A1 * | 4/2004 | Gross et al. | 714/15 |
| 2004/0122621 | A1 * | 6/2004 | Vezzu et al. | 702/182 |
| 2007/0239407 | A1 * | 10/2007 | Goldfine et al. | 703/2 |

* cited by examiner

*Primary Examiner*—Marc Duncan
(74) *Attorney, Agent, or Firm*—Park, Vaughan & Fleming LLP

(57) ABSTRACT

One embodiment of the present invention provides a system that estimates residual life of a software system under a software-based failure mechanism. During operation, the system first constructs a prognostic database for the software-based failure mechanism based on a plurality of software systems of the same type as the software system, wherein the prognostic database includes a set of prognostic readings associated with the software-based failure mechanism from the plurality of software systems. Note that a given prognostic reading in the prognostic database comprises: (1) a symptom index, which is a function of one or more variables associated with the software-based failure mechanism; and (2) a residual life, which is the remaining time to a failure under the software-based failure mechanism. Next, the system obtains a symptom index value from the software system which is being monitored. The system then estimates a residual life for the software system under the software-based failure mechanism by comparing the symptom index value with the prognostic readings in the prognostic database.

20 Claims, 3 Drawing Sheets

ESTIMATING THE RESIDUAL LIFE OF A SOFTWARE SYSTEM UNDER A SOFTWARE-BASED FAILURE MECHANISM

BACKGROUND

1. Field of the Invention

The present invention relates to techniques for designing highly reliable software systems. More specifically, the present invention relates to a method and an apparatus that estimates time to failure in a software system and provides quantitative confidence bounds around this estimation.

2. Related Art

When computer systems run for long periods of time, they are increasingly affected by a phenomenon known as "software aging," which is typically accompanied by performance degradation of the computer systems over time, and can eventually lead to a crash of user applications and even the entire computer system. Software aging can be caused by a multitude of factors, including memory leaks, unreleased file locks, accumulation of unterminated threads, accumulation of numerical errors, file space fragmentation, shared memory pool latching and thread stack bloating.

For example, a memory leak is a common type of software aging mechanism which is caused by a failure to release memory when the memory is no longer needed by a program. Long-running programs with memory leaks and programs that allocate memory extensively can consume enough memory to seriously hinder overall performance of the computer system, or even worse, to cause an application or the entire system to crash. This problem becomes even more acute in multi-user environments, where a large number of users can be affected by a single application with a memory leak.

Note that a memory leak causes the computer system as a whole, not merely the erroneous process, to use an ever-growing amount of memory. Eventually, much (or all) of the available memory will be allocated (and not freed), thereby causing the entire system to become severely degraded or to crash. System administrators typically do not receive a warning about this problem until 95%-98% of the available memory has been used up. In most cases, this is too late to initiate any preventive maintenance actions and can end up causing costly system downtime.

Although we have discussed the software aging problem using the example of memory leaks, similar problems arise with other system resources, such as file tables, process tables and other kernel structures. Hence, solutions to the memory leak problem can be generalized and extended to these other system resources as well.

A number of approaches have been taken to deal with the problems related to software aging. For example, some existing tools facilitate debugging programs and detecting resource leaks when the source code is available. However, these existing tools cannot be used when the source code is not available; for example, when third-party and off-the-shelf software is used.

Another approach to deal with resource leaks is based on threshold limits. In this approach, alarms are issued when the resource consumption exceeds a predetermined limit. When such limit is reached, preventive actions such as software rejuvenation operations can be initiated. Unfortunately, such predetermined threshold limit is usually set arbitrarily or subjectively. Note that a threshold limit that is set too low causes increased false alarms, thereby making preventive maintenance policies inefficient; whereas a threshold limit that is set too high results in missed alarms which causes unplanned outages.

Preventive maintenance policies based on time are sometimes used to solve the problem of software aging. In this approach, the threshold which triggers preventive actions is an "elapsed time". Specifically, preventive maintenance is initiated at predetermined deterministic time intervals. For example, there can be a policy to reboot system every Saturday at midnight. However, this technique also suffers from the same problems of possible false alarms and missed alarms as described above.

Note that none of the above-described techniques provide estimates for a remaining time to crash/hang, i.e., a remaining time to failure of a system due to the software aging. If estimates can be made for the remaining time to failure due to a software aging mechanism, preventive actions such as software rejuvenation can be optimally scheduled to avoid potentially serious unplanned outages.

One technique that detects software aging and predicts remaining time to failure involves detecting gradual resource exhaustion in a computer system. This technique performs time-series analysis to detect trends in resource usage and to estimate the time to resource exhaustion based on the detected trends. Preventive actions can be taken accordingly to avoid impending failures. Unfortunately, this technique has several drawbacks. Firstly, it does not pinpoint the offending process, and hence, the entire system may have to be rebooted. Secondly, it provides no feedback to facilitate root-cause analysis. Furthermore, subtle memory leaks cannot be detected when the memory usage is heavy and "noisy," which is commonly the case in multi-user server systems.

Hence, what is needed is a method and apparatus for estimating remaining time to failure for computer systems due to software aging without the above-described problems.

SUMMARY

One embodiment of the present invention provides a system that estimates residual life of a software system under a software-based failure mechanism. During operation, the system first constructs a prognostic database for the software-based failure mechanism based on a plurality of software systems of the same type as the software system, wherein the prognostic database includes a set of prognostic readings associated with the software-based failure mechanism from the plurality of software systems. Note that a given prognostic reading in the prognostic database comprises: (1) a symptom index, which is a function of one or more variables associated with the software-based failure mechanism; and (2) a residual life, which is the remaining time to a failure under the software-based failure mechanism. Next, the system obtains a symptom index value from the software system which is being monitored. The system then estimates a residual life for the software system under the software-based failure mechanism by comparing the symptom index value with the prognostic readings in the prognostic database.

In a variation on this embodiment, the system constructs the prognostic database for the software-based failure mechanism for a given system by: (1) monitoring the system during operation until a system failure occurs, wherein the monitoring involves recording system values associated with the software-based failure mechanism at various recording times $t_i$; (2) verifying that the system failure is caused by the software-based failure mechanism, and if so: (a) recording the time of failure $t_f$, (b) computing a set of symptom indices $s_i$ and associated residual lives $r_i$ based on the recorded system values; and (c) storing the set of prognostic readings $(s_i, r_i)$ in the prognostic database for the software-based failure mechanism.

In a variation on this embodiment, the system estimates the residual life of a software system under a plurality of software-based failure mechanisms simultaneously.

In a further variation on this embodiment, the residual life $r_i$ at a given recording time $t_i$ is computed as $r_i=t_f-t_i$.

In a variation on this embodiment, the system estimates the residual life for the software system by computing at least one of: (1) a mean of the residual life; (2) a variance of the residual life; and (3) confidence bounds for the residual life.

In a further variation on this embodiment, the system computes the mean of the residual life by computing a conditional probability density function $f(r|s^*)$ for a given symptom index value $s^*$, wherein r is the residual life.

In a further variation on this embodiment, the confidence bounds of the residual life are tighter when the number of software systems in the prognostic database is larger.

In a variation on this embodiment, the software-based failure mechanism can include software aging, which can involve: (1) a memory leak; (2) other types of resource exhaustion problems; (3) accumulation of numerical errors; and (4) latching of a share pool memory.

In a further variation on this embodiment, the system computes the symptom index for the memory-leak failure mechanism from a memory leak index (MLI) and a currently-available memory.

In a variation on this embodiment, the system takes preventive action based on the estimated residual life for the software system, which can include performing a software rejuvenation operation.

In a variation on this embodiment, the system estimates residual life of a software system using a Continuous System Telemetry Harness (CSTH).

Tables 1-6 illustrate an exemplary prognostic database comprising six tables for six software systems which all have memory leaks.

Table 7 lists a selected value from each of the six systems in the prognostic database which is used to computing a residual life corresponding to a symptom value $s^*=95.01$.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Overview

The present invention estimates remaining useful life of software systems due to software-based failure mechanisms and provides confidence bounds around the estimates. During a "learning stage", the present invention uses historical data collected from monitoring resource-related telemetry metrics on a large number of software systems to construct a knowledge database. Next, during a real-time "monitoring stage" for a specific software system, the knowledge database is used to compute an expected remaining useful life based on current values of the telemetry metrics.

More specifically, during the learning stage, the system constructs a prognostic database for a given software-based failure mechanism, (e.g., a memory leak) by collecting a sufficiently large set of prognostic data associated with system failures from a large number of software systems of the same type. Next, during the monitoring stage, the system uses the prognostic database to estimate the remaining useful life for a specific software system during operation.

Constructing a Prognostic Database for a Selected Failure Mechanism

Figure 1:
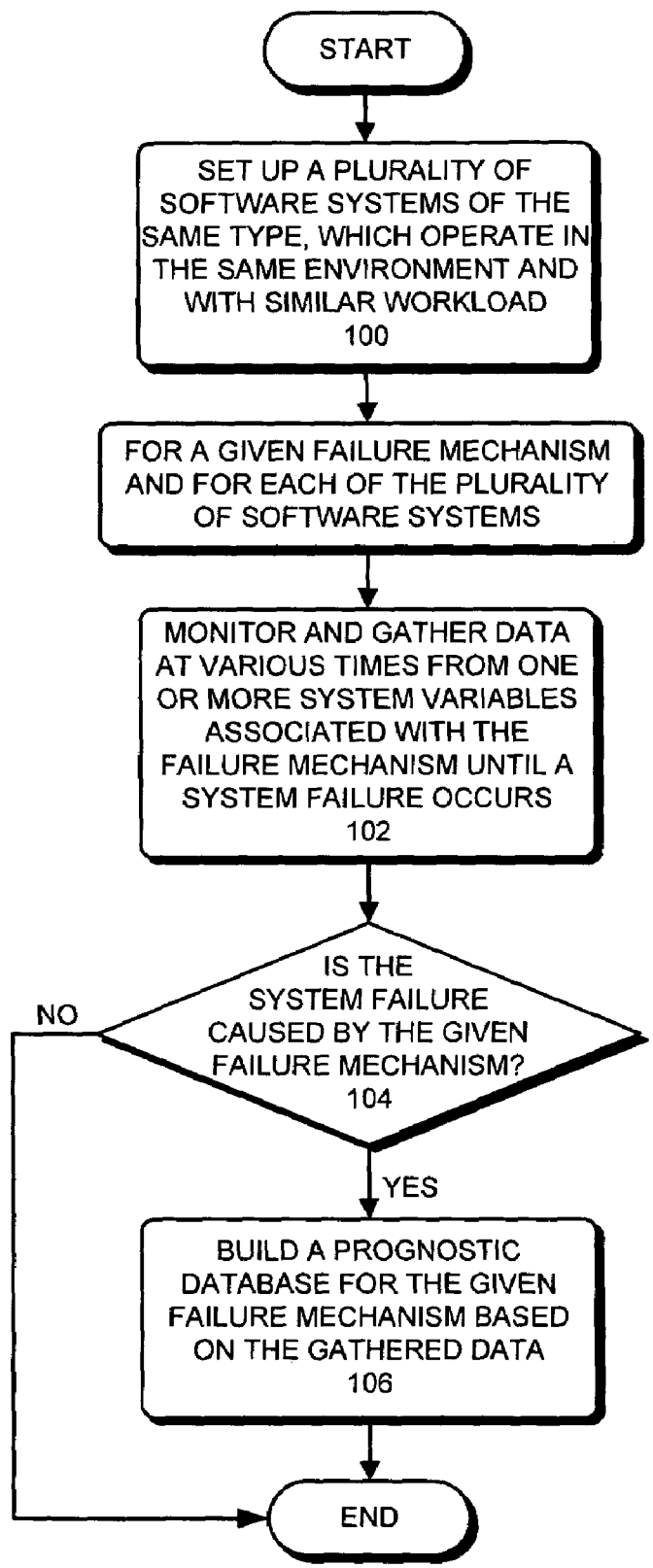
FIG. 1 presents a flowchart illustrating the process of constructing the prognostic database for the software-based failure mechanism in accordance with an embodiment of the present invention.

FIG. 1 presents a flowchart illustrating the process of constructing a prognostic database for a software-based failure mechanism in accordance with an embodiment of the present invention.

The process starts with setting up a plurality of software systems that are essentially of the same type (step 100). During a subsequent data collecting process, these systems operate in essentially the same environment and with substantially similar workload profiles. Generally, the plurality of software systems can be used to construct multiple prognostic databases, wherein each of the multiple prognostic databases is built for a different software-based failure mechanism (e.g., one for memory leaks, one for accumulation of numerical errors, etc.). In one embodiment of the present invention, the process constructs these prognostic databases simultaneously from data collected from the plurality of software systems. In another embodiment of the present invention, the process constructs one prognostic database at a time for a single failure mechanism. For simplicity, in the description below, we describe the process of constructing one prognostic database for a selected software-based failure mechanism. However, the general technique can be easily extended to constructing multiple prognostic databases.

Next, the process monitors the plurality of software systems on one or more system variables (e.g., memory usage, free memory) which are related to the selected failure mechanism (e.g., a memory leak) (step 102). During the monitoring, the process gathers time-series data for the system variables at various times from the beginning of the monitoring process. Note that the data gathering does not have to begin at a system initialization time, nor does it have to be periodic. In other words, the gathered time-series data does not have to have constant time intervals. The monitoring process can start any time after the system initialization and continues until a system failure occurs. In one embodiment of the present invention, the monitoring/gathering process is preformed by a telemetry system using sensors embedded in the system. These sensors can include physical hardware sensors and virtual software sensors. In one embodiment of the present invention, this telemetry system can be a Continuous System Telemetry Harness (CSTH).

After each system failure, the process performs a root-cause-analysis of the failure to verify that the system failure is actually caused by the selected failure mechanism (step 104). If the failure is caused by a different failure mechanism, the collected telemetry data may not be used to build the prognostic database for the given failure mechanism.

Figure 2:
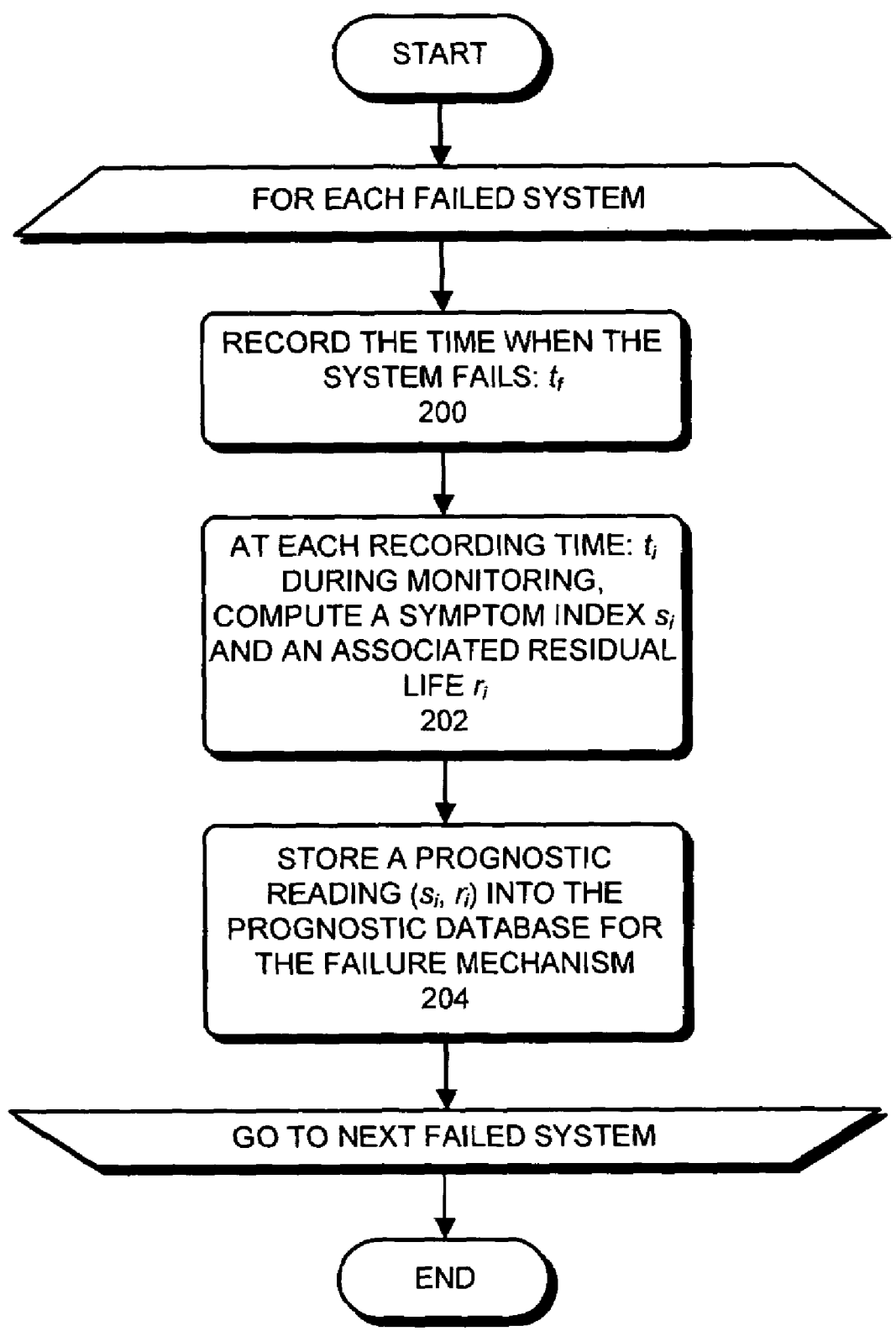
FIG. 2 presents a flowchart illustrating the process of building the prognostic database using the gathered telemetry data in accordance with an embodiment of the present invention.

If the process verifies that the failure mechanism is the selected failure mechanism, the gathered telemetry data are then entered into the prognostic database (step 106). FIG. 2 presents a flowchart illustrating the process of building the prognostic database using the gathered telemetry data in accordance with an embodiment of the present invention.

The process starts by recording the time when a system in the plurality of software systems fails, $t_f$ (step 200). Next, for the telemetry data collected at ith recording time $t_i$ during the monitoring, the process computes a symptom index $s_i$ at the recording time and an associated residual life $r_i$ (step 202). Specifically, the residual life $r_i$ at the recording time $t_i$ is the difference between the time the system failed, $t_f$, and the time the readings were taken, $t_i$. Hence, $r_i = t_f - t_i$.

The symptom index $s_i$ is a function of one or more system variables that were measured and recorded directly from the software system using the telemetry system. Hence, the symptom index, $s_i = f(v_{1i}, v_{2i}, v_{3i}, \ldots, v_{ni})$ where $v_{1i}, v_{2i}, v_{3i}, \ldots, v_{ni}$ are n of these system variables.

In the case that the selected failure mechanism is caused by memory leaks, one may use a memory leak index (MLI) and a currently available memory to compute the symptom index s in the following way:

symptom index, $s_i = MLI_i/m_i$, where $MLI_i$ is the MLI at the ith reading, $m_i$ is the remaining memory available in the system being monitored at the ith reading, and $s_i$ is the symptom index associated with $MLI_i$ and $m_i$.

Note that the MLI has an exponentially smoothed slope which gives a rate of change of memory usage. More specifically, the MLI incorporates an "exponential forgetting function" that gives more weight to recent changes in memory utilization and less weight to older historical observations for long running processes (this is because when processes are launched there is usually a sudden step change in memory utilization; it is only the subsequent net growth in memory utilization for long-running processes that are of interest here). The symptom index, s, increases if MLI increases or the currently available memory, m, decreases. The procedure to compute the MLI is described in more details in U.S. patent application Ser. No. 11/195,015, entitled, "Method and Apparatus for Detecting Memory Leaks in Computer Systems," by inventors K. Vaidyanathan, S. Thampy and K. Gross. This patent application is hereby incorporated by reference.

Next, referring back to FIG. 2, for each computed symptom index $s_i$ and the associated residual life $r_i$, the process stores a prognostic reading $(s_i, r_i)$ into the prognostic database associated with the selected failure mechanism (step 204). The process repeats steps 202 and 204 for telemetry data recorded at different times $t_i$ to compute and store $(s_i, r_i)$ into the database. Eventually, the prognostic database comprises of a set of prognostic readings in the form of (s, r), wherein s is a symptom index and r is the remaining time to failure.

Note that, if the plurality of software systems comprises k systems that have failed because of the selected failure mechanism, the process obtains substantially similar data from these k systems. However, the number of readings for each of the k systems need not to be the same. Moreover, data from new software systems of the same type can be subsequently added into this prognostic database as they become available. Additionally, systems that have failed can be restarted and monitored and readings from these systems can be added to the prognostic database, wherein the restarted systems are regarded as new systems.

Estimating Residual Life for a Software System Using the Database

Figure 3:
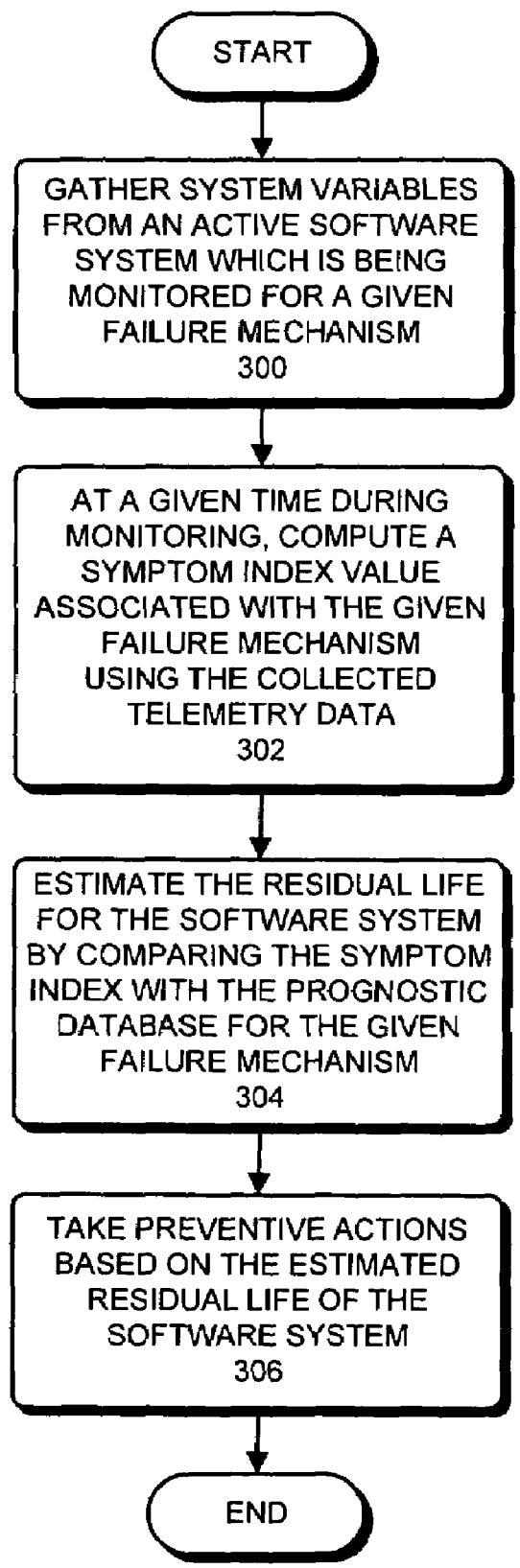
FIG. 3 presents a flowchart illustrating the process of estimating the residual life of an active software system associated with the selected failure mechanism in accordance with an embodiment of the present invention.

After the prognostic database is built for the selected failure mechanism, the database can be used to estimate a residual life associated with the selected failure mechanism for a software system in operation. More specifically, FIG. 3 presents a flowchart illustrating the process of estimating the residual life of an active software system associated with the selected failure mechanism in accordance with an embodiment of the present invention.

During operation, the system monitors and gathers system variables from the software system, which is of the same type as the systems that were used to construct the prognostic database (step 300). In one embodiment of the present invention, the monitoring/gathering process is preformed by a telemetry system comprising sensors embedded in the system. These sensors can include physical hardware sensors and virtual software sensors. In one embodiment of the present invention, the telemetry system can be a Continuous System Telemetry Harness (CSTH).

Next, at a given time, the system computes a symptom index value s* associated with the selected failure mechanism using the collected telemetry data (step 302). For example, s*=MLI*/m* for a memory leak, wherein MLI* and m* are the memory leak index and currently available memory at the given time.

The system then estimates the residual life for the software system by comparing the symptom index value s* with the prognostic readings in the prognostic database (step 304). Note that system estimates the residual life for the software system by computing a mean (or expected value) of the residual life, a variance of the residual life, and confidence bounds for the residual life. We describe how these values are computed in more detail below.

Note that the residual life of the monitored software system under the condition of symptom index value s* is non-deterministic. Hence, the residual life r has a probability distribution associated with symptom index value s*, which can be described by a probability density function (PDF) f(r|s*).

The PDF function f(r|s*) can be assumed to be a conditional distribution with non-stationary moments, i.e., as the symptom index s* increases, the shape and scale of this distribution also changes.

Hence, the expected value of the residual life E[r|s*] for the given symptom index, s*, is given by:

$$E[r|s^*] = \int_0^\infty rf(r|s^*)dr = \frac{\int_0^\infty rf(r, s^*)}{p(s^*)},$$

wherein p(s*) is the probability of occurrence of the symptom index s*. We need to include this probability in the calculation because some of the software systems which were used to construct the prognostic database may have failed before ever reaching the symptom index values s*.

In one embodiment of the present invention, we can approximate the PDF function $f(r|s^*)$ from the prognostic readings corresponding to each of the k failed systems in the prognostic database. Specifically, for each of the k failed systems, we choose the reading $(S_a\hat{}, r_a)$ such that value $|s^*-s_a\hat{}|$ is minimized for all a=1, . . . , n, wherein n is the number of prognostic readings for that particular system.

We can now derive an estimate for the expected residual life from the readings in the prognostic database using the follow equation:

$$E_{estimate}[r|s^*] \approx \frac{\sum_{i=1}^{k} r_i f(r_i|s_i^*)}{p(s^*)}.$$

Next, the variance of the expected residual life E[r|s*] is given by:

$$Var[r|s^*] = \int_0^\infty r^2 f(r|s^*) - (E[r|s^*])^2.$$

In the same manner as to obtain $E_{estimate}$, the variance of the expected residual life can be estimated from the readings in the prognostic database as:

$$Var_{estimate}[r|s^*] \approx \sum_{i=1}^{k} r_i^2 f(r_i|s_i^*) - (E_{estimate}[r|s^*])^2.$$

Note that it is desirable to also provide confidence bounds around the computed expected residual life as another measure of uncertainty, which defines an interval around the computed expected value. These bounds provide quantitative measure (typically in a percentage value) of confidence that the true expected value will fall within the interval defined by the bounds.

To compute the confidence bounds, we can use the central limit theorem (CLT), which states that a large-sample distribution function of the conditional mean for a random sample from $f(r|s^*)$ is a normally distributed function Z, which is given by:

$$z = \frac{(\bar{r}|s^*) - E(r|s^*)}{Var(r|s^*)\sqrt{k}},$$

wherein k is the number of systems in the prognostic database. Hence, a 95% confidence interval around the estimated expected residual life which contains the true expected value is given by:

$$(\bar{r}|s^*) \pm 1.96[Var(r|s^*)/\sqrt{k}]$$

Note that the estimates for the expected residual life and the associated variance become closer to the true values and the confidence bounds become tighter as the number of readings and number of systems in the prognostic knowledge database increase.

Finally, based on the above estimates for the software system being monitored, the system can take preventive actions, which can include performing a software rejuvenation operation on the software system (step 306).

EXAMPLE

The example below estimates residual life for a system suffering from memory leak failure mechanism by using a prognostic database comprising data from six training systems, which all have failed from the same memory leak failure mechanism. The database includes six tables for the six systems, which are listed in Table 1 to Table 6, respectively. Note that each table for a given system comprises a set of readings including the symptom value and residual life.

Suppose that we are at the point of the monitoring process when there remains 100 MB of available memory, and the memory leak index (MLI) is 9501.00, and we want to estimate the expected residual life and variance for the system. In this case, we start with computing the symptom index, s*=9501.00/100=95.01. We then construct a table which comprises readings $s_a\hat{}$ from each of the six systems such that $|s^*-s_a\hat{}|$ is minimized within each of the six systems. Next, we compute the conditional probability $f(r|s^*)$ as the relative frequency of occurrence of the symptom index value s*=95.01. Because there are 6 systems with readings that are equally likely to occur, this relative frequency is ⅙. The table which includes readings corresponding to $s_a\hat{}$ and f(r|s*) for the six systems is shown in Table 7.

Note that because one system out of the six systems, System 5, has failed before reaching the symptom index value of 95.01, the probability of occurrence of the symptom index s*=95.01, p(s*), is ⅚. Consequently, the reading corresponding to System 5 in Table 7 records the residual life as 0 when the symptom index value is greater than 87.66.

Using the formula that computes an estimated expected residual life, we get:

$$E_{estimate}[R|s^*] \approx \frac{\sum_{i=1}^{6} r_i f(r_i|s_i^* = 95.01)}{p(s^* = 95.01)}, \text{ and}$$

$$E_{estimate}[R|s^*] \approx \frac{(20+17+31+6+0+10) \times (1/6)}{p(s^* = 95.01)} = 16.80 \text{ days}.$$

Similarly, the estimate for the variance is:

$Var_{estimate}[R|s^*] \approx [(20^2+17^2+31^2+6^2+0^2+10^2) \times (\frac{1}{6})] - (16.8)^2 = 15.43$ days.

Finally, 95% confidence bounds around this estimate of expected residual life is:

16.80±1.96[28.83/$\sqrt{6}$]=16.80±12.34 days.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

TABLE 1

The exemplary prognostic database associated with System 1 of the six systems suffering from memory leaks

| Memory available (MB) | Memory Leak Index (MLI) | Symptom Index | Residual life (days) |
|---|---|---|---|
| 1024 | 92.16 | 0.09 | 89 |
| 900 | 1278.00 | 1.42 | 56 |
| 402 | 1571.82 | 3.91 | 45 |
| 200 | 1066.00 | 5.33 | 42 |
| 90 | 540.90 | 6.01 | 34 |
| 87 | 1769.50 | 20.34 | 29 |
| 67 | 3294.39 | 49.17 | 23 |
| 23 | 2024.00 | 88.00 | 20 |
| 12 | 1267.68 | 105.64 | 11 |
| 3 | 457.44 | 152.48 | 1 |

TABLE 2

The exemplary prognostic database associated with System 2 of the six systems suffering from memory leaks

| Memory available (MB) | Memory Leak Index (MLI) | Symptom Index | Residual life (days) |
|---|---|---|---|
| 640 | 6.40 | 0.01 | 52 |
| 612 | 7607.76 | 12.43 | 46 |
| 500 | 6460.00 | 12.92 | 35 |
| 419 | 8237.54 | 19.66 | 32 |
| 103 | 4535.09 | 44.03 | 24 |
| 99 | 5544.00 | 56.00 | 19 |
| 70 | 5734.40 | 81.92 | 17 |
| 45 | 5134.50 | 114.10 | 13 |
| 19 | 2217.68 | 116.72 | 2 |

TABLE 3

The exemplary prognostic database associated with System 3 of the six systems suffering from memory leaks

| Memory available (MB) | Memory Leak Index (MLI) | Symptom Index | Residual life (days) |
|---|---|---|---|
| 2048 | 2908.16 | 1.42 | 189 |
| 2002 | 7387.38 | 3.69 | 178 |
| 1970 | 8175.50 | 4.15 | 171 |
| 1670 | 7548.40 | 4.52 | 154 |
| 1304 | 25858.32 | 19.83 | 108 |
| 1003 | 24082.03 | 24.01 | 79 |
| 908 | 35974.96 | 39.62 | 51 |
| 876 | 58586.88 | 66.88 | 40 |
| 456 | 46388.88 | 101.73 | 31 |
| 203 | 21095.76 | 103.92 | 12 |

TABLE 4

The exemplary prognostic database associated with System 4 of the six systems suffering from memory leaks

| Memory available (MB) | Memory Leak Index (MLI) | Symptom Index | Residual life (days) |
|---|---|---|---|
| 1024 | 921.60 | 0.09 | 89 |
| 987 | 996.87 | 1.01 | 56 |
| 893 | 9197.90 | 1.03 | 45 |
| 789 | 15306.60 | 1.94 | 42 |
| 563 | 31640.60 | 5.62 | 34 |
| 453 | 85707.60 | 18.92 | 29 |

TABLE 4-continued

The exemplary prognostic database associated with System 4 of the six systems suffering from memory leaks

| Memory available (MB) | Memory Leak Index (MLI) | Symptom Index | Residual life (days) |
|---|---|---|---|
| 203 | 49998.90 | 24.63 | 23 |
| 123 | 51795.30 | 42.11 | 20 |
| 121 | 55248.60 | 45.66 | 18 |
| 90 | 47043.00 | 52.27 | 14 |
| 65 | 45350.50 | 69.77 | 12 |
| 33 | 29247.90 | 88.63 | 9 |
| 12 | 11280.00 | 94.00 | 6 |
| 4 | 3946.00 | 98.65 | 1 |

TABLE 5

The exemplary prognostic database associated with System 5 of the six systems suffering from memory leaks

| Memory available (MB) | Memory Leak Index (MLI) | Symptom Index | Residual life (days) |
|---|---|---|---|
| 1231 | 1797.26 | 1.46 | 152 |
| 1089 | 2526.48 | 2.32 | 134 |
| 983 | 5539.50 | 5.65 | 120 |
| 563 | 3924.11 | 6.97 | 102 |
| 444 | 8276.16 | 18.64 | 84 |
| 378 | 7556.22 | 19.99 | 79 |
| 231 | 6613.53 | 28.63 | 54 |
| 145 | 4640.00 | 32.00 | 40 |
| 101 | 3986.47 | 39.47 | 33 |
| 96 | 6022.08 | 62.73 | 14 |
| 15 | 1217.40 | 81.16 | 12 |
| 9 | 788.94 | 87.66 | 10 |

TABLE 6

The exemplary prognostic database associated with System 6 of the six systems suffering from memory leaks

| Memory available (MB) | Memory Leak Index (MLI) | Symptom Index | Residual life (days) |
|---|---|---|---|
| 986 | 8282.40 | 0.84 | 201 |
| 890 | 14418.00 | 1.62 | 190 |
| 800 | 13360.00 | 1.67 | 189 |
| 711 | 31426.20 | 4.42 | 167 |
| 563 | 44420.70 | 7.89 | 135 |
| 400 | 79280.00 | 19.82 | 134 |
| 304 | 65937.60 | 21.69 | 111 |
| 165 | 45441.00 | 27.54 | 109 |
| 144 | 44654.40 | 31.01 | 78 |
| 134 | 82691.40 | 61.71 | 65 |
| 100 | 88090.00 | 88.09 | 45 |
| 33 | 33534.60 | 101.62 | 10 |
| 12 | 12472.80 | 103.94 | 4 |
| 4 | 4675.20 | 116.88 | 1 |

TABLE 7

Selected values from each of the six systems in the prognostic database involves in computing a residual life corresponding to symptom value $s^* = 95.01$

| System | $(\hat{s_a}, r_a)$ | $f(r|s^*)$ |
|---|---|---|
| 1 | (88, 20) | 1/6 |
| 2 | (81.92, 17) | 1/6 |

TABLE 7-continued

Selected values from each of the six systems in the prognostic database involves in computing a residual life corresponding to symptom value s* = 95.01

| System | $(\hat{s_a}, r_a)$ | $f(r|s^*)$ |
|---|---|---|
| 3 | (101.73, 31) | 1/6 |
| 4 | (94.00, 6) | 1/6 |
| 5 | (>87.66, 0) | 1/6 |
| 6 | (101.62, 10) | 1/6 |

What is claimed is:

1. A method for estimating residual life of a software system under a software-based failure mechanism, comprising:
constructing a prognostic database for the software-based failure mechanism based on a plurality of software systems of the same type as the software system,
wherein the prognostic database includes a times-series of prognostic readings associated with the software-based failure mechanism from the plurality of software systems; and
wherein a given prognostic reading at a given timestamp in the time-series of prognostic readings comprises:
a symptom index computed at the given timestamp as a function of one or more variables associated with the software-based failure mechanism, wherein the one or more variables are recorded at the given timestamp; and
a residual life, which is the remaining time computed from the given timestamp to a failure time under the software-based failure mechanism;
obtaining a symptom index value from the software system which is being monitored; and
estimating a residual life for the software system under the software-based failure mechanism by comparing the symptom index value with the prognostic readings in the prognostic database.

2. The method of claim 1, wherein for a given system in the plurality of software systems, constructing the prognostic database for the software-based failure mechanism involves:
monitoring the system during operation until a system failure occurs, wherein while monitoring, recording system values associated with the software-based failure mechanism at various recording times $t_i$;
verifying that the system failure is caused by the software-based failure mechanism, and if so,
recording the time of failure $t_f$;
computing a set of symptom indices $s_i$ and associated residual lives $r_i$ based on the recorded system values, and
storing the time-series of prognostic readings $(s_i, r_i)$ in the prognostic database for the software-based failure mechanism.

3. The method of claim 2, wherein the residual life $r_i$ at a given recording time $t_i$ is computed as $r_i=t_f-t_i$.

4. The method of claim 1, wherein the method is performed for a plurality of software-based failure mechanisms simultaneously.

5. The method of claim 1, wherein estimating the residual life for the software system involves computing at least one of:
a mean of the residual life;
a variance of the residual life; and
confidence bounds for the residual life.

6. The method of claim 5, wherein computing the mean of the residual life involves computing a conditional probability density function f(r|s*) for a given symptom index value s*, wherein r is the residual life.

7. The method of claim 5, wherein the confidence bounds of the residual life are tighter when the number of software systems in the prognostic database is larger.

8. The method of claim 1, wherein the software-based failure mechanism can include software aging, which can involve,
a memory leak;
other types of resource exhaustion problems;
accumulation of numerical errors; and
latching of a share pool memory.

9. The method of claim 8, wherein the symptom index for The memory-leak failure mechanism is computed from a memory leak index (MLI) and a currently-available memory.

10. The method of claim 1, wherein the method further comprises taking preventive action based on the estimated residual life for the software system, which can include performing a software rejuvenation operation.

11. The method of claim 1, wherein the method is performed using a Continuous System Telemetry Harness (CSTH).

12. A computer-readable storage medium storing instructions that when executed by a computer cause the computer to perform a method for estimating residual life of a software system under a software-based failure mechanism, the method comprising:
constructing a prognostic database for the software-based failure mechanism based on a plurality of software systems of the same type as the software system,
wherein the prognostic database includes a time-series of prognostic readings associated with the software-based failure mechanism from the plurality of software systems; and
wherein a given prognostic reading at a given timestamp in the time-series of prognostic readings comprises:
a symptom index computed at the given timestamp as a function of one or more variables associated with the software-based failure mechanism wherein the one or more variables are recorded at the given timestamp; and
a residual life, which is the remaining time computed from the given timestamp to a failure time under the software-based failure mechanism;
obtaining a symptom index value from the software system which is being monitored; and
estimating a residual life for the software system under the software-based failure mechanism by comparing the symptom index value with the prognostic readings in the prognostic database.

13. The computer-readable storage medium of claim 12, wherein for a given system in the plurality of software systems, constructing the prognostic database for the software-based failure mechanism involves:
monitoring the system during operation until a system failure occurs, wherein while monitoring, recording system values associated with the software-based failure mechanism at various recording times $t_i$;
verifying that the system failure is caused by the software-based failure mechanism, and if so,
recording the time of failure $t_f$;
computing a set of symptom indices $s_i$ and associated residual lives $r_i$ based on the recorded system values, and storing the time-series of prognostic readings ($s_i$, $r_i$) in the prognostic database for the software-based failure mechanism.

14. The computer-readable storage medium of claim 12, wherein the method is performed for a plurality of software-based failure mechanisms simultaneously.

15. The computer-readable storage medium of claim 12, wherein estimating the residual life for the software system involves computing at least one of:
   a mean of the residual life;
   a variance of the residual life; and
   confidence bounds for the residual life.

16. The computer-readable storage medium of claim 15, wherein computing the mean of the residual life involves computing a conditional probability density function $f(r|s^*)$ for a given symptom index value $s^*$, wherein $r$ is the residual life.

17. The computer-readable storage medium of claim 12, wherein the software-based failure mechanism can include software aging, which can involve,
   a memory leak;
   other types of resource exhaustion problems; and
   accumulation of numerical errors; and
   latching of a share pool memory.

18. An apparatus that estimates residual life of a software system under a software-based failure mechanism, comprising:
   a construction mechanism configured to construct a prognostic database for the software-based failure mechanism based on a plurality of software systems of the same type as the software system;
      wherein the prognostic database includes a time-series of prognostic readings associated with the software-based failure mechanism from the plurality of software systems; and
      wherein a given prognostic reading at a given timestamp in the time-series of prognostic readings comprises:
         a symptom index, computed at the given timestamp as a function of one or more variables associated with the software-based failure mechanism wherein the one or more variables are recorded at the given timestamp; and
         a residual life, which is the remaining time computed from the given timestamp to a failure time under the software-based failure mechanism;
   an obtaining mechanism configured to obtain a symptom index value from the software system which is being monitored; and
   an computing mechanism configured to estimate a residual life for the software system under the software-based failure mechanism by comparing the symptom index value with the prognostic readings in the prognostic database.

19. The apparatus of claim 18, wherein for a given system in the plurality of software systems, the construction mechanism is configured to construct the prognostic database for the software-based failure mechanism by:
   monitoring the system during operation until a system failure occurs, wherein while monitoring, recording system values associated with the software-based failure mechanism at various recording times $t_i$;
   verifying that the system failure is caused by the software-based failure mechanism, and if so,
      recording the time of failure $t_f$,
      computing a set of symptom indices $s_i$ and associated residual lives $r_i$ based on the recorded system values, and
      storing the time-series of prognostic readings ($s_i$, $r_i$) in the prognostic database for the software-based failure mechanism.

20. The apparatus of claim 18, wherein the estimation mechanism is configured to estimate the residual life for the software system by computing at least one of:
   a mean of the residual life;
   a variance of the residual life; and
   confidence bounds for the residual life.

* * * * *